US011951619B2

(12) United States Patent
Salisbury, Jr. et al.

(10) Patent No.: US 11,951,619 B2
(45) Date of Patent: Apr. 9, 2024

(54) CABLED DIFFERENTIAL FOR CABLE CONTROLLED JOINT

(71) Applicant: The Board of Trustees of the Leland Stanford Junior University, Stanford, CA (US)

(72) Inventors: J. Kenneth Salisbury, Jr., Mountain View, CA (US); Alex Nathan Kahn, Glen Ellyn, IL (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1036 days.

(21) Appl. No.: 16/605,284

(22) PCT Filed: Apr. 25, 2018

(86) PCT No.: PCT/US2018/029356
§ 371 (c)(1),
(2) Date: Oct. 15, 2019

(87) PCT Pub. No.: WO2018/200670
PCT Pub. Date: Nov. 1, 2018

(65) Prior Publication Data
US 2020/0047332 A1    Feb. 13, 2020

Related U.S. Application Data

(60) Provisional application No. 62/490,319, filed on Apr. 26, 2017.

(51) Int. Cl.
*F16H 48/12* (2012.01)
*B25J 9/10* (2006.01)
(Continued)

(52) U.S. Cl.
CPC ............... *B25J 9/102* (2013.01); *B25J 9/104* (2013.01); *B25J 17/0275* (2013.01); *F16H 48/12* (2013.01); *F16H 48/20* (2013.01)

(58) Field of Classification Search
CPC .. B25J 9/102; B25J 9/104; B25J 9/105; F16H 37/08; F16H 37/0806; F16H 48/12; F16H 48/20; F16H 19/0628
See application file for complete search history.

(56) References Cited

U.S. PATENT DOCUMENTS

| | | | |
|---|---|---|---|
| 4,806,066 A * | 2/1989 | Rhodes | B25J 9/104 700/254 |
| 4,903,536 A | 2/1990 | Salisbury, Jr | |

(Continued)

FOREIGN PATENT DOCUMENTS

| | | | | |
|---|---|---|---|---|
| JP | 2016120537 | | 7/2016 | |
| KR | 101250043 B1 * | | 4/2013 | B25J 11/003 |

*Primary Examiner* — Bobby Rushing, Jr.
(74) *Attorney, Agent, or Firm* — LUMEN PATENT FIRM (57) ABSTRACT

Cable-actuated differential enabling N degrees of freedom provided by a plurality of pulleys and at least N+1 tensioning cables. The cable-actuated differential increases a dynamic force range by minimizing co-activation of the tensioning cables at any operating point. A cable-actuated differential having three cables provides motor based control of a 2 DOF joint that can be applied to robots or teleoperation. A cable-actuated mechanical differential having opposing bevel gears and a middle bevel gear meshed with the opposing gear allows an output connector to controllably and independently rotate about the x axis or y axis via three operational modes without backlash.

7 Claims, 9 Drawing Sheets

(51) Int. Cl.
*B25J 17/02* (2006.01)
*F16H 48/20* (2012.01)

(56) References Cited

U.S. PATENT DOCUMENTS

| | | | |
|---|---|---|---|
| 4,921,293 A | | 5/1990 | Ruoff |
| 5,046,375 A | * | 9/1991 | Salisbury, Jr. ........ F16H 19/005 74/89.22 |
| 8,234,949 B2 | * | 8/2012 | Pan ........................ B25J 9/102 901/21 |
| 9,314,934 B2 | * | 4/2016 | Whitney ................ B25J 19/002 |
| 10,753,439 B2 | | 8/2020 | Awtar |
| 2008/0072497 A1 | | 3/2008 | Oxley |
| 2008/0216596 A1 | * | 9/2008 | Madhani ................ B25J 9/104 901/26 |
| 2008/0229862 A1 | * | 9/2008 | Nakamoto ............ B25J 9/1045 901/21 |
| 2012/0198952 A1 | * | 8/2012 | Mamba ................ F16H 19/005 74/96 |
| 2014/0083233 A1 | * | 3/2014 | Mamba ................ B25J 9/102 901/26 |

\* cited by examiner

CABLED DIFFERENTIAL FOR CABLE CONTROLLED JOINT

CROSS-REFERENCE TO RELATED APPLICATIONS

This application is a 371 of PCT application PCT/US2018/029356 filed Apr. 25, 2018. PCT application PCT/US2018/029356 claims the benefit of US Provisional application 62/490319 filed Apr. 26, 2017.

FIELD OF INVENTION

The present invention relates generally to a mechanical differential. More particularly, the invention relates to a mechanical differential that is pulley-actuated for controlling both bank and roll degrees of freedom. The mechanical differential has application to robotics and teleoperation.

BACKGROUND

Typically linkages, gears, shafts, belts in conjunction with actuators (for example, motors, manual, hydraulics, weight) are used to conduct the motions and forces generated by the actuators to another location. This conduction of motions and forces to another location is referred to as transmission. Examples include bicycle chain drives, clock gears and automobile timing belts. These examples have one attribute in common. They perform bi-directional transmission. A shaft may exert torque in a positive or negative sense, as can gears and timing belts. Similarly an electric motor can cause motion in either direction.

In contrast, there is another class of such mechanisms which use "uni-sense" actuators and/or transmissions. Uni-sense actuators refer those that can only generate force in one direction (such as a single action pneumatic cylinder or steering thruster on a satellite). Uni-sense transmissions can induce motion and force in only one direction. Tension cables and hydraulic hoses are examples. Tension cables conduct motion and force through tension, while hydraulic hoses conduct motion and force through pressure.

In this disclosure, the term "N+1 designs" refers to the observation that, for a N degree-of-freedom (DOF) mechanism such as a robot arm, N+1 is the minimum number of uni-sense transmissions/actuators required to exert complete (bi-directional) freedom of control over the N degree-of-freedom mechanism. For example, to be able to impose full 6 DOF control of a satellite, 7 uni-sense thrusters are required (i.e. N+1 actuators). Using this relationship, a 3 DOF Stanford/JPL Robot Hand could be controlled using 4 motor tensioned Bodin cables, as disclosed in U.S. Pat. No. 4,921,293 (Ruoff et al., May 1, 1990), herein incorporated by reference.

SUMMARY OF THE INVENTION

To address the needs in the art, a cable-actuated differential having N degrees of freedom is provided that includes a plurality of actuation elements, a plurality of pulleys, each pulley having one or more tensioning cables independently attached along the perimeter of the respective pulley, where the number of tensioning cables is at least N+1, where N is equal to at least 1, and mounting structure that allows rotation of the pulleys, where the tensioning cables are co-activated by the actuation elements by simultaneously applying minimum tension without causing slack.

According to one aspect, the invention further includes a plurality of gears in association with each of the pulleys, where two or more of the gears are circular and have faces that oppose each other and which are mounted to a respective shaft, where one or more others of the gears are meshed to each of the opposing gears. In one aspect, two of the opposing gears are bevel gears that are mounted to a common shaft, and a middle bevel gear is meshed to each of the opposing bevel gears. In another aspect, tension values applied to at least one tensioning cable is different from other tensioning cables causing rotation of a respective pulley and an associated circular gear.

According to a further aspect of the invention, the cable-actuated differential is a two degree of freedom joint, where the plurality of pulleys includes a first pulley and a second pulley, where the first pulley has an attached respective cable under tension, and is mounted to an axis of rotation, where the second pulley is mounted perpendicular to the first pulley, and includes a pair of cables independently attached to the second pulley, where one or more tensions applied to the pair of cables are such that co-activation of the cables at any operation point is minimized.

In another aspect of the invention, the cable-actuated differential is a two degree of freedom joint, where the plurality of pulleys includes a first pulley and a pair of second pulleys, where the first pulley has an attached respective cable under tension, and is mounted to an axis of rotation, where the pair of second pulleys that are mounted parallel to the first pulley, have a pair of cables independently attached to the respective second pulleys, and the first pulley is located adjacent to the pair of second pulleys, wherein various one or more tensions applied to the pair of cables are such that co-activation of the cables at any operation point is minimized. In one aspect, the invention further includes a common shaft, where the common shaft is along the axis of rotation of the first pulley and the pair of common pulleys, where the pair of second pulleys rotate freely about the common shaft and the first pulley is keyed to the common shaft such that the first pulley rotates together with the common shaft. In another aspect, the invention further include a fork mounted to the common shaft, an operating shaft rigidly mated to the fork, an output connector mounted to rotate freely about the operating shaft, a pair of bevel gears rigidly mounted to the pair of second pulleys, and a middle bevel gear meshed to each of the pair of bevel gears, where the operating shaft being perpendicular to the common shaft such that the operating shaft mated to the fork rotate together with the first pulley, where the output connector being rigidly connected to the middle bevel gear such that the output connector rotates about the operating shaft together with rotation of the middle bevel gear.

In yet another aspect, the invention further includes a plurality of smooth surfaced rotating members in association with each of the pulleys, and two of the smooth surfaced rotating members opposing each other and mounted to a common shaft, and a middle smooth surfaced rotating member meshed to each of the opposing bevel gears, where the meshing between the middle smooth surfaced rotating member and one of the opposing smooth surfaced rotating members is by a cable that is used as a meshing element. In one aspect, the tension values applied to at least one tensioning cable is different from other tensioning cables causing rotation of a respective pulley and an associated smooth surfaced rotating member.

According to one aspect, the invention further includes a plurality of gears in association with the pulleys, at least one of the gears is circular and is mounted to a respective shaft, wherein at least one of the other gears is a rack that is meshed to the at least one of the circular gears.

In one embodiment, the invention is system having two N+1 cable-actuated differentials interconnected to each other by cables connected to a first pulley and a second pulley of each differential, the two cable-actuated differentials each rotate in a coordinated manner about their respective x-axes. According to one aspect, the invention further includes a pair of opposing bevel gears rigidly mounted to the first pulley and the second pulley, respectively, and a middle bevel gear meshed with the opposing bevel gears, where the middle bevel gear rotates by a relative movement of the first pulley and the second pulley by applying different tensions to respective tensioning cables. In another aspect, a third pulley is positioned outside the other pulleys, where the two cable-actuated differentials rotate 360 degrees depending on the cable length.

According to another embodiment, a method is provided for operating a cable-actuated differential over N degrees of freedom having at least N+1 cables under tension, where the cable-actuated differential includes a plurality of pulleys, each having one or more of the cables attached, where tension is independently activated on each cable without slack such that co-activation between the cables is minimized, where co-activation of the tensioning cables is minimized by minimizing the amount of tension applied simultaneously to the cables without causing slack. In another aspect, the method further includes bevel gears in association with each of the pulleys, where two of the bevel gears oppose each other and are mounted to a common shaft, and a middle bevel gear is meshed to each of the opposing bevel gears. According to one aspect, the method further includes when cables of the pulleys associated with the opposing bevel gears are held in place, pulling on the third cable tensions the differential and eliminates backlash between middle bevel gear and either of the two opposing bevel gears without causing rotation of any of the gears about their respective shafts. In yet another aspect, the cable-actuated differential further includes bevel gears in association with each of the pulleys, where two of the bevel gears opposing each other and mounted to a common shaft, and a middle bevel gear are meshed to each of the opposing bevel gears, where when the cable attached to the pulley associated with the middle bevel gear is held stationary, a cable associated with one of the opposing bevel gears is pulled, and a cable associated with the other of the opposing bevel gears is let out, rotating the middle bevel gear about its central axis. In yet another aspect, the method further includes bevel gears in association with each of the pulleys, where two of the bevel gears are opposing each other and mounted to a common shaft, and a middle bevel gear is meshed to each of the opposing bevel gears, where when the cables associated with the opposing bevel gears are pulled together while the cable associated with the middle bevel gear is let out, moving the middle bevel gear about the circumference of the opposing bevel gears. Additionally, the method further includes a plurality of smooth surfaced rotating members in association with each of the pulleys, where two of the smooth surfaced rotating members opposing each other and mounted to a common shaft, where a middle smooth surfaced rotating member meshed to each of the opposing bevel gears, where the independently activating tension on each cable causes a relative rotation between the middle smooth surfaced rotating member and one of the opposing smooth surfaced rotating members by a cable that is used as a meshing element. In another aspect, the method further includes applying different tension values to at least one tensioning cable that is different from other tensioning cables causing rotation of a respective pulley and an associated smooth surfaced rotating member.

DETAILED DESCRIPTION

Referring now to the drawings, wherein like reference numerals designate identical or corresponding parts throughout several views, the following description relates to a cable differential for use in a joint for robotics or teleoperation applications.

Mechanisms for robotics and teleoperation include joints and involve multiple degrees of freedom and various forces. For example, a mechanism for performing minimally invasive surgery, such as that described in U.S. Pat. No. 5,807,377, incorporated herein by reference in its entirety, may be operated according to a scheme which uses a large range of motion of the surgical end effector. An interface for teleoperation such as that described in U.S. Pat. No. 5,587,937, incorporated herein by reference in its entirety, may include the use of a user's body member, which enables physical exchange of force with a user. A robotic hand having a wrist joint and a plurality of fingers, each having a plurality of joints such as that described in U.S. Pat. No. 4,921,293, incorporated herein by reference in its entirety, includes a cable tension sensing structure mounted on a portion of the hand. In the mechanisms for robotics and teleoperation, mechanical transmission, such as from a motor to a haptic grip, has several important physical attributes. These include friction (static, dynamic, Striebek, stiction), hysteresis, mechanical impedance/transfer functions, and backlash. Stiction is the phenomenon of stick-slip friction, which is present in most devices where mechanical components are in sliding contact. Stiction must be overcome by a breakaway force, which limits the smallest force the actuator can output. Mechanical impedance is the additional force created at the output by load motion. Mechanical impedance is a function of the frequency of the load motion. As an example, a backdrivable system is considered to have low impedance. Geared actuators have non-linear, non-continuous dynamics such as stiction and backlash. Backlash relates to mesh between gears and is the amount of clearance between mated gear teeth. Backlash occurs when the direction of movement is reversed.

Cabled transmissions excel at minimizing stiction and achieving zero backlash. This is important because parasitic stiction and hysteresis may introduce amplitude and frequency dependent non-linearity, which affect both the cable transmission's gain and phase changes. Parasitic stiction and hysteresis limit the fidelity of a transmission and can lead to limit cycle and instability problems. Muscle is the best known technology that approaches a perfect force source as it has extremely low impedance and stiction.

A cable for cabled-transmission is preferably highly stiff, strong, flexible, and has small diameter as possible given the stress that will be encountered in operation. The cable may be made of steel or alloys thereof, synthetic materials, composite materials such as carbon fiber reinforced plastic, and Kevlar, and be strong enough to resist fatigue at the force levels encountered in transmission, including transient impulse torques that may exceed a steady state torque. The diameter and characteristics will depend on the specific application including factors such as the applied torque, the output torque, and the bending radii required by various pulleys necessary to produce the output torque.

An important measure of quality of mechanical transmission is the "dynamic force range." Dynamic Force Range is a measure of the range of forces that can be handled by the system. It may be defined as a ratio of the maximum force that a system can exert (transmit) over (divided by) friction force. As an example, an inexpensive motor can deliver a dynamic force range of around 10:1; an off-the-shelf actuator has a relatively high dynamic range of about an 80:1. Humans have a dynamic range in force sensing greater than $10^4$.

A disclosed method uses uni-sense actuation and transmission elements to induce bi-directional motions and forces on the target mechanism. To control motion and forces imposed on a bi-direction N DOF mechanism requires at least N+1 uni-sense transmission elements (e.g. tension cables). The extra degree input freedom can, by minimizing co-activation, ensure that none of the uni-sense the N+1 transmission elements will go slack. Co-activation is a term used to describe certain muscle motion, in which both muscles, or sets of muscles, contract at the same time. Muscle co-activation produces compression on a joint, which causes the joint to become stiffer and more stable. In addition, the stability of muscle co-activation allows precise fine motion, such as in picking up a small object. In this disclosure, the term co-activation refers to the simultaneous pulling (applying of tension) on tension elements, or the simultaneous pushing by applying pressure on hydraulic elements. In other words, transmission elements such as tension cables or hydraulic hoses are independently activated without any slack. The varying the N+1$^{th}$ degree of transmission action enables modulation of the mechanical characteristics such as joint friction, viscosity and stiffness.

An aspect of the present invention includes varying the "internal motion" or "homogeneous solution" or "co-activation" of the internal loading on mechanism structures without affecting the particular solution required for actuating the N degrees of freedom. Variations in internal motion may include bank or rotating motion, or a combination of bank and rotation motion, or may include a rack and pinion motion. A homogeneous solution can include co-activation of 2 or more cables, or hydraulic hoses, at once.

An aspect of the present invention includes a method that substantially increases the dynamic range possible in force exertion. By minimizing the co-activation at any operation point the friction that must be overcome can be minimized at that operating point. Minimizing co-activation enables reduction in friction force such that an order of magnitude increase can be achieved in dynamic force range.

Figure 1:
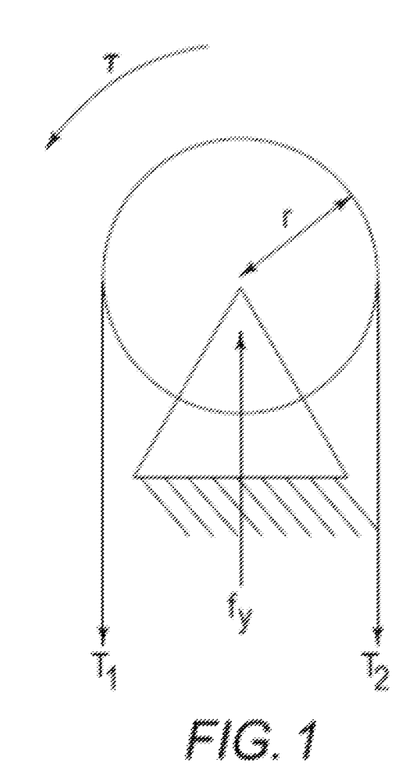
FIG. 1 shows a schematic diagram of torque applied to a one DOF mechanism.

FIG. 1 shows a schematic drawing of a torque applied to a one DOF cable mechanism. The mechanism has two tension cables, which are independently attached to a pulley. The pulley is rotated by applying tension to both cables without allowing slack in either cable. In this mechanism, co-activation is the simultaneous pulling (applying tension) on both cables without slack. The tension applied to each cable is a value tension T1 and T2, respectively. The difference in tension on each cable is such that the pulley undergoes a torque τ and a force $f_y$. Applying an increasing amount of co-activation, i.e., greater amount of tension that is simultaneously applied on both cables, leads to a decrease in dynamic force range due to the frictions forces, for example bearing force $f_y$. Co-activation may be minimized by reducing the tension force that is simultaneously applied on both cables to a level that ensures no slack, which leads to a reduction in bearing load $f_y$ and reduced friction. Thus, by minimizing co-activation, but without causing slack, the dynamic force range of the system can be increased. A controller, such as that described in U.S. Pat. No. 5,327,790, incorporated herein by reference in its entirety, may be used to regulate power to a motor for very accurate force control.

Figure 2:
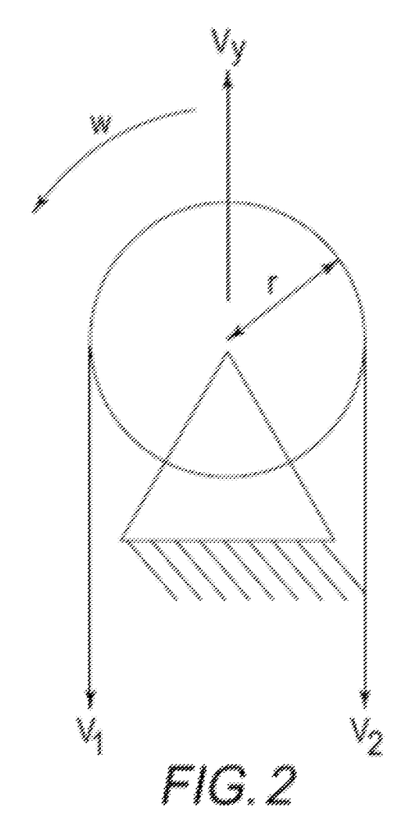
FIG. 2 shows a schematic diagram of resulting forces in the one DOF mechanism.
Figure 3A:
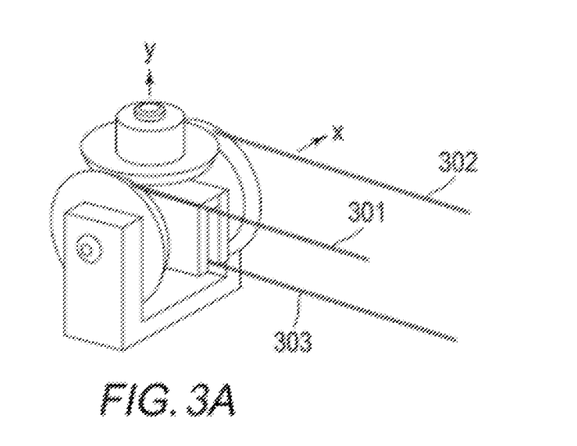
FIGS. 3A-3D show different views of a three cable Mechanical Differential, according to one exemplary embodiment of the invention.
Figure 3B:
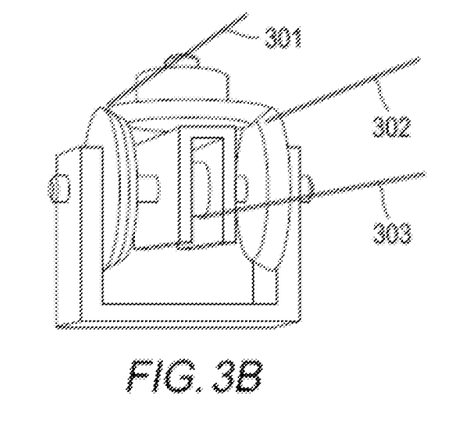
Figure 3C:
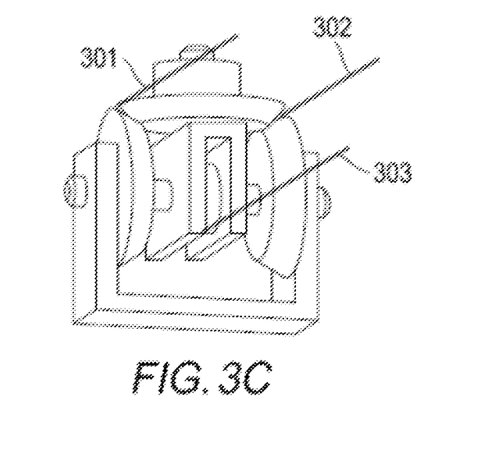
Figure 3D:
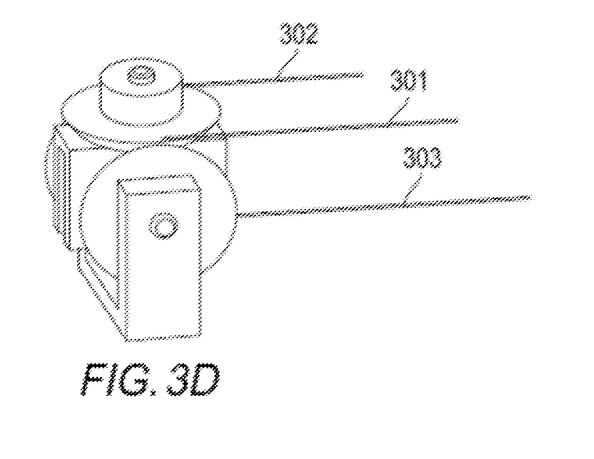

FIG. 2 is a schematic that shows the reaction force for the one DOF cable mechanism. The tension forces $V_1$ and $V_2$ cause the reaction force $V_y$ and torque w. The tension forces $V_1$ and $V_2$ can be varied to cause a different reaction force and torque.

FIGS. 3A-3D show schematic drawings that shows a joint mechanism having three tension cables 301, 302, 303 and capable of two degrees of freedom (DOF). Independent activation of the three cables 301, 302, 303 can be applied to maintain the internal loading on the mechanism and achieve a homogeneous solution that reduces the amount of co-activation. Tension applied to cables 301 and 302 that is different from tension applied to 303 may result in rotation about the X-axis. Tension applied to cable 301 that is different from tension applied to cable 302, while maintaining a tension on cable 303, may result in rotation about the Y-axis. It is preferable that co-activation be minimized at any operation point. By minimizing the co-activation at any operation point, the friction that must be overcome at that point can be minimized and thereby the dynamic force range is increased.

Figure 4:
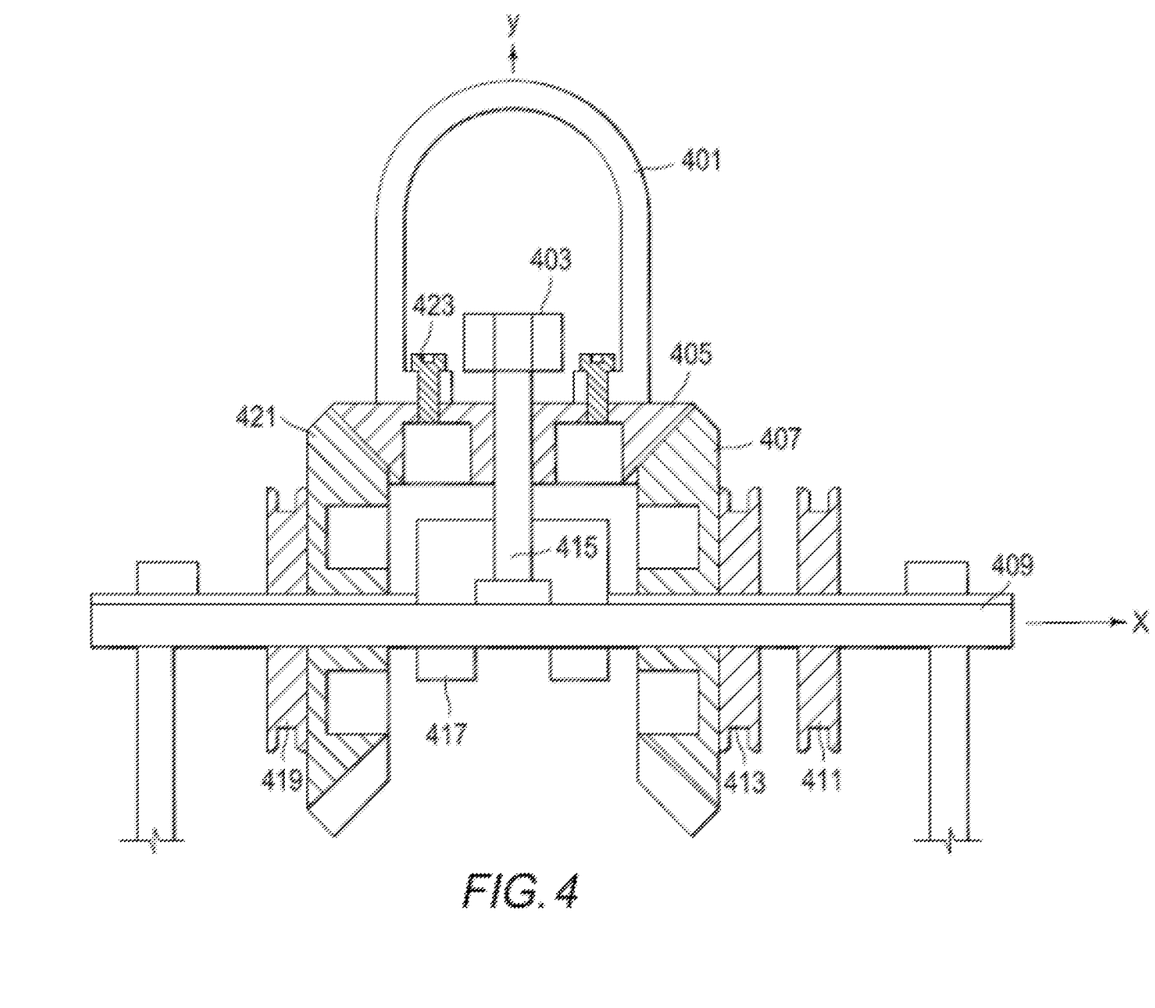
FIG. 4 shows section view of a N+1 Mechanical Differential, according to one embodiment of the invention.

FIG. 4 shows a section view of a N+1 Mechanical Differential of an exemplary embodiment of the disclosure. The mechanical differential includes two opposing bevel gears 421, 407 facing each other. Although the example in FIG. 4 shows a bevel gear, other types of gears are possible. For example, the gears may be a pair of herring bone gears. The two opposing bevel gears 421, 407 have respective pulleys 419, 413 attached thereto to enable control of rotation about a common axle 409 by way of respective tensioning cables. A third bevel gear 405 meshes with the pair of opposing bevel gears 421, 407. The third bevel gear 405 has an axle 415 that is fixedly attached at one end to a fork 417, which is mounted to the common axle 409 of the opposing bevel gears 421, 407. A third cable is attached to a third pulley 411. The third bevel gear 405 may have an input/output device 401 held by way of axle 415 and cap 403. The input/output device 401 may be attached to the third bevel gear 405 by bolts 423. In the case of a pair of herring bone gears, each herring bone gear may mesh with a pair of bevel gears, with the third bevel gear 405 being a gear that is common to the pair of herring bone gears.

Although the example in FIG. 4, as well as the example of herring bone gears, relate to round bevel gears, a rack and pinion arrangement is also possible. The rack and pinion arrangement may provide for a linear motion in place of the rotation movement of the third bevel gear 405. In an exemplary aspect, each opposing bevel gear 421, 407 may be replaced with pinion gears that mesh with a respective rack to produce independent linear motion.

In one embodiment, the input/output device 401 may be a motor that drives the third bevel gear 405. Alternatively, the input/output device 401 may output to a rotating element.

In one embodiment, the common axle 409 is a SHAFT WITH KEYWAY that is the mounting body for most components. Pulley 419 and Left Bevel Gear 421 are rigidly mated to each other, and the combination of those two parts rotates freely about SHAFT WITH KEYWAY 409. Pulley 419 and Right Bevel Gear 407 are rigidly mated to each other, and the combination of those two parts rotate freely about SHAFT WITH KEYWAY 409. Pulley 411 is rigidly connected to SHAFT WITH KEYWAY 409 via a KEY (see 509 in FIG. 5), such that the pulley 411 rotates together with the SHAFT WITH KEYWAY 409. Fork 417 is also rigidly connected to SHAFT WITH KEYWAY 409 via a KEY (see 507 in FIG. 5), such that Pulley 411 and Fork 417 rotate together. However, Left Bevel Gear 421/Pulley 419 and Right Bevel Gear 407/Pulley 413 are free to rotate about SHAFT WITH KEYWAY 409. SHAFT WITHOUT KEYWAY 415 is rigidly mated to Fork 417. Middle Bevel Gear 405 rotates freely about SHAFT WITHOUT KEYWAY 415. Input/Output Connector 401 is rigidly connected to Middle Bevel Gear 405 by threaded fasteners 423. Shaft Collar 403 is rigidly connected to SHAFT WITHOUT KEYWAY 415.

Figure 5:
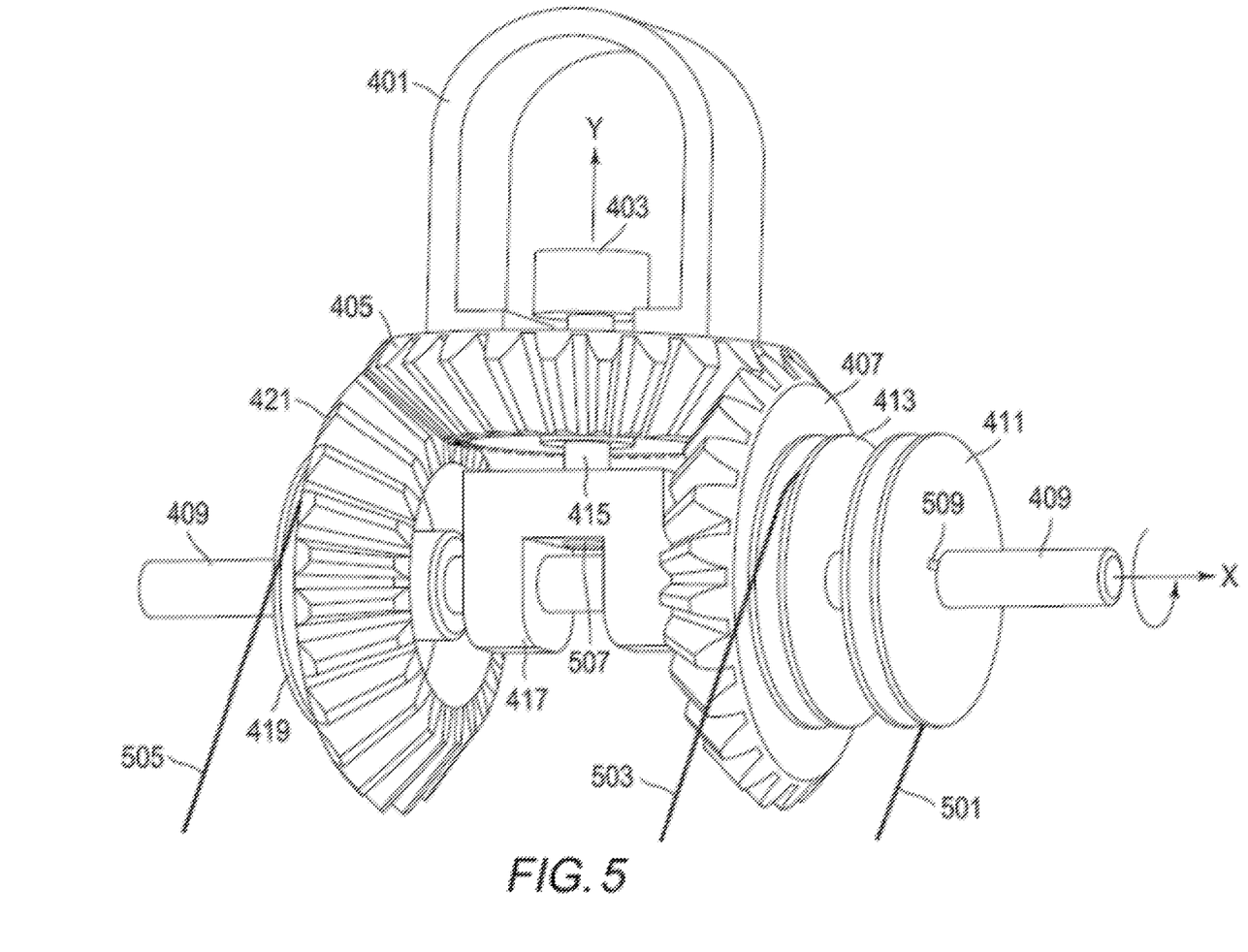
FIG. 5 shows a perspective view of the N+1 Mechanical Differential of FIG. 4.

FIG. 5 shows a perspective view of the N+1 Mechanical Differential of FIG. 4. As can be seen in FIG. 5, each pulley 411, 413, 419 has one tension cable 501, 503, 505 attached, to which a respective tension is applied by a respective tensioning device, such as a motor.

The N+1 mechanical differential is capable of a pivot motion in which the third bevel gear 405 may rotate up or down about the circumference of the opposing bevel gears 421, 407 by applying greater tension to cables 503, 505 than to cable 501. The N+1 mechanical differential is capable of a bank motion by applying greater tension to one of cables 503 or 505, causing one of two opposing bevel gears 421, 407 to rotate to cause the third bevel gear 405 to move to one side. The N+1 mechanical differential is capable of motion based on a combination of pivot and bank motions.

In particular, in a first mode of operation:
When CABLE 1 505 and CABLE 2 503 are held in place, pulling on CABLE 3 501 tensions the system and eliminates backlash between Middle Bevel Gear 405 and either of the two bevel gears Left Bevel Gear 421 or Right Bevel Gear 407, but causes no rotation of any of the gears about their respective shafts.

In a second mode of operation:
With CABLE 3 501 (and thus Pulley 3 411) held stationary, if CABLE 1 505 is pulled and CABLE 2 503 is let out (or vice versa), the Middle Bevel Gear 405 will rotate about SHAFT WITHOUT KEYWAY 415 (axis y)

In a third mode of operation:
When CABLE 1 505 and CABLE 2 503 are pulled together while CABLE 3 501 is let out (or vice versa), the Fork 417 will rotate about Axis x together with SHAFT WITHOUT KEYWAY 415, and will cause a resultant rotation of Middle Bevel Gear 405 about Axis x.

The input/output connector 401 can be made to controllably and independently rotate about axis x or axis y via the three aforementioned operational modes, without backlash, by way of co-activation of tension on cables 503, 505, and 501.

Although the arrangement shown in FIG. 4 and FIG. 5 includes meshed bevel gears, it is understood that the function of meshing gears may be accomplished by the use of cables. In one embodiment, the three bevel gears may be replaced with smooth surfaced rotating members. A transmission between two or more of the smooth surfaced rotating members may be provided by using a cable as the meshing element. See U.S. Pat. No. 4,903,536, incorporated herein by reference in its entirety, which describes a structure in which one or more cables may be used to mesh smooth outer surface rotating members that have non-parallel axes of rotation. In an example aspect, a cable transmission may be implemented as a uni-directional transmission using rotating members 405' and 407' meshed by a cable. Each rotating member 405', 407' rotates about an associated axis of revolution.

Figure 6:
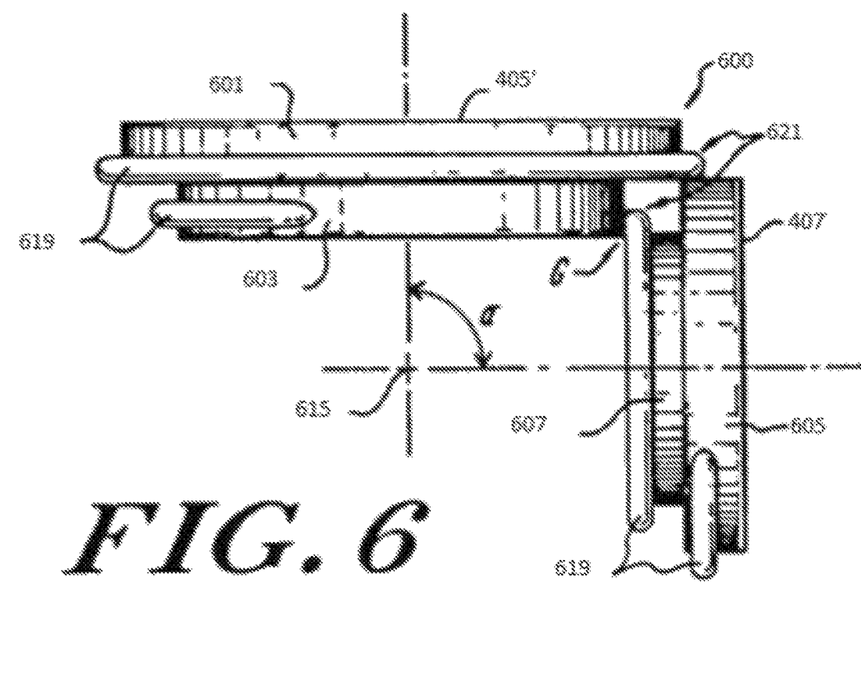
FIG. 6 shows a perspective view of a bi-directional cable transmission, according to one exemplary embodiment of the invention.

FIG. 6 shows a bi-directional transmission using rotating members 405' and 407' that are axially stepped to produce two smooth cable-carrying surfaces 601, 603 and 605, 607 on each rotating member that are both smooth outer surfaces (cylindrical and generally parallel to the axis of rotation of the associated rotating member 405' or 407'). The rotating members are positioned so that the surfaces 601, 603 and 605, 607 of each rotating member are closely spaced by the gap G from the corresponding smooth outer surface on the other paired rotating member of the transmission. The angle $\alpha$ is most conveniently 90° to achieve this relationship and to have the axes of rotation of the rotating members intersect at 615, however, with compensating adjustments in the dimensions of the rotating members outer surfaces and radii, the angle $\alpha$ may be vary slightly from 90°. Each surface 601, 603 and 605, 607 carries a separate cable 619'. By wrapping the cables on the surfaces in opposite directions, as shown, the differential becomes bi-directional in that there is a positive drive as one of the two lengths of cable 619' wraps on one of the smooth outer surfaces if either rotating member 405' and 407' is driven to rotate in either direction. It should be noted that the centers of the cables at the transfer points 621 lie along a line that passes through the point of intersection 615. If the cables are properly tensioned, this bi-directional drive will be substantially free of backlash, an operating characteristic which is difficult to achieve using standard meshed bevel gears.

Figure 7:
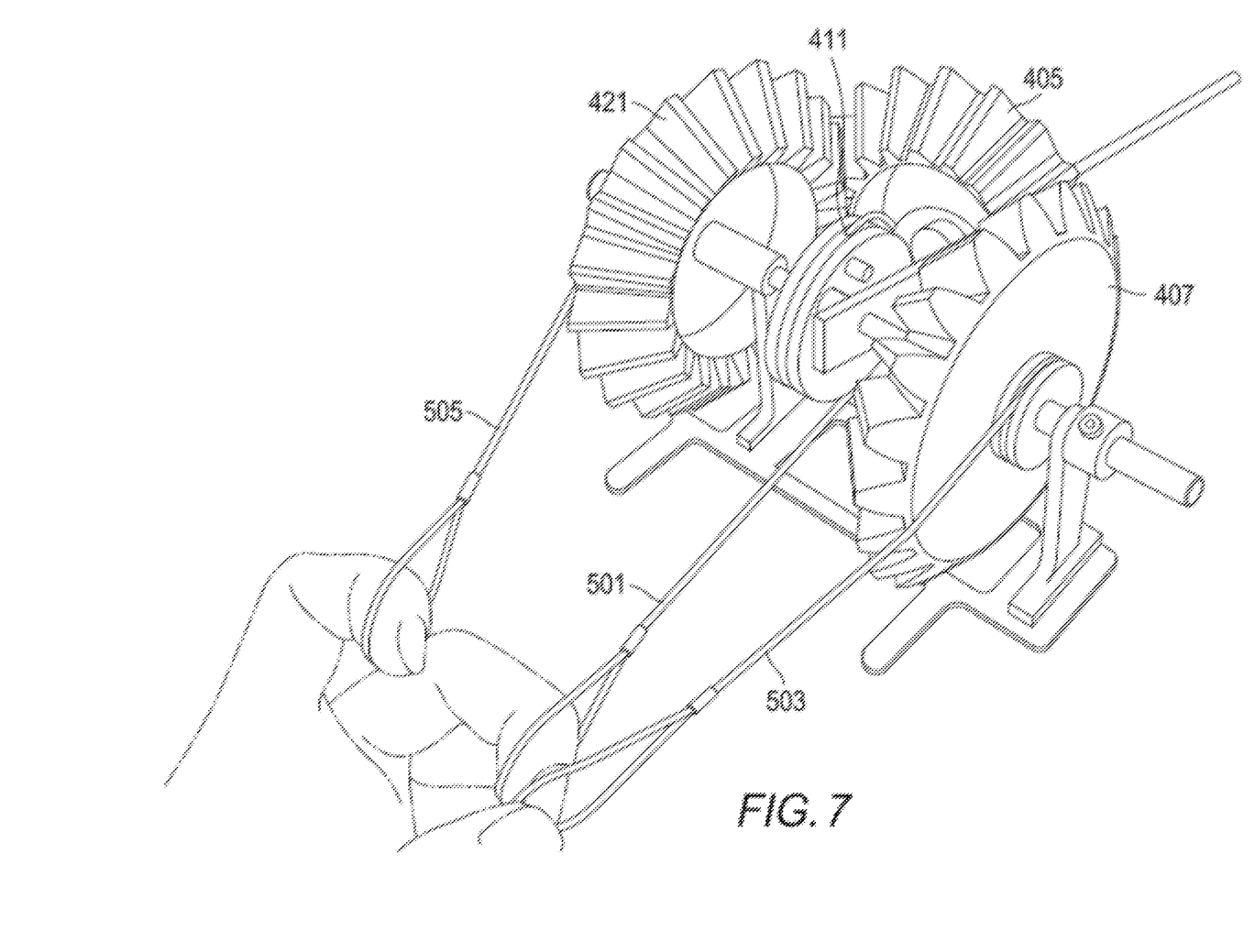
FIG. 7 shows a perspective view of an example of a N+1 Mechanical Differential, according to one exemplary embodiment of the invention.

FIG. 7 shows a perspective view of a N+1 Mechanical Differential of one embodiment. As shown in FIG. 7, the pulley 411 is located between the opposing bevel gears 421 and 407. It is preferred that tension be applied to the tension cables in a manner that co-activation is kept to a minimum. Three tension cables are independently attached to a respective pulley and tension is continuously applied to each cable. An alternative cable that wraps around a pulley such that both ends of the cable can have tension applied would be subject to friction forces, such as striction, as the cable may start to slip around the pulley under certain tensioning conditions. Also, the cable may encounter slack at one end of the cable, for example, as tensioning changes at one end of the cable. The independently attached cables as shown in the example in FIG. 7 minimizes the effects of friction forces and requires minimum tension on all cables without slack to produce motion. By attaching the cables individually, striction is minimized. The requirement that tensioning be applied to all cables to induce motion reduces the possibility of slack. Also, co-activation may be minimized by simultaneously applying the minimum amount of tension that does not cause slack.

Figure 8:
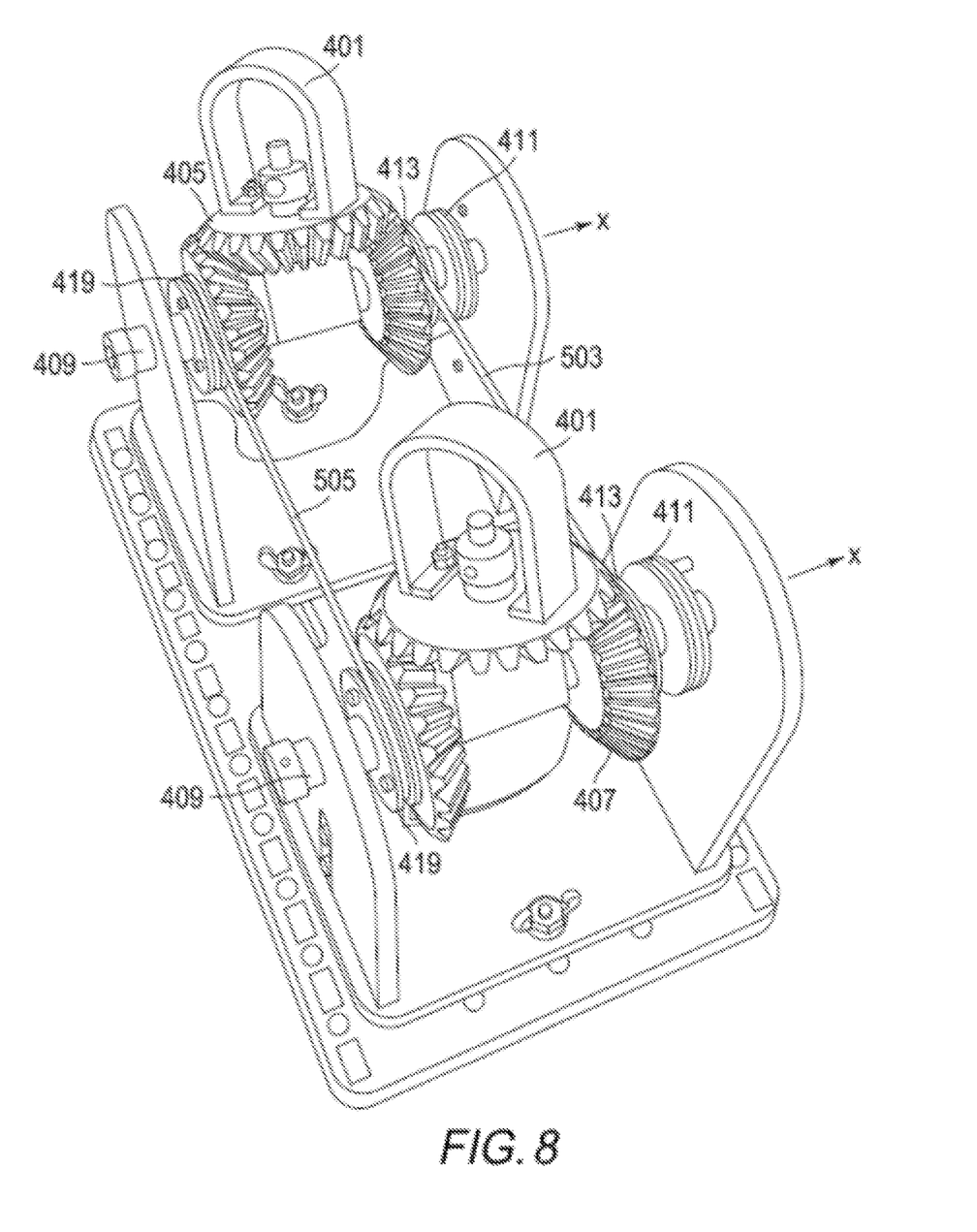
FIG. 8 shows a perspective view that illustrates two N+1 Mechanical Differentials having interconnected cables, according to one exemplary embodiment of the invention.

FIG. 8 shows perspective view of two N+1 Mechanical Differentials interconnected to each other by cables connected to Pulley (1) 419 and Pulley (2) 413 of each Differential. The two Mechanical Differentials each rotate in a coordinated manner about their respective x-axes. Middle Bevel Gear 405 can rotate by a relative movement of Pulley 419 and Pulley 413 by different tensions applied to CABLE 505 and CABLE 503. By placing Pulley (3) 411 outside the other pulleys, the two Mechanical Differentials can rotate up to 360 degrees about respective x-axis depending on the cable length.

In one embodiment, one of the mechanical differentials may be actuated by motors. In such case, the one mechanical differential can act on other mechanical differentials. For example, a first of two mechanical differentials may actuate the second differential by using N bi-directional actuators to apply forces about element 401 and 409.

Figure 9A:
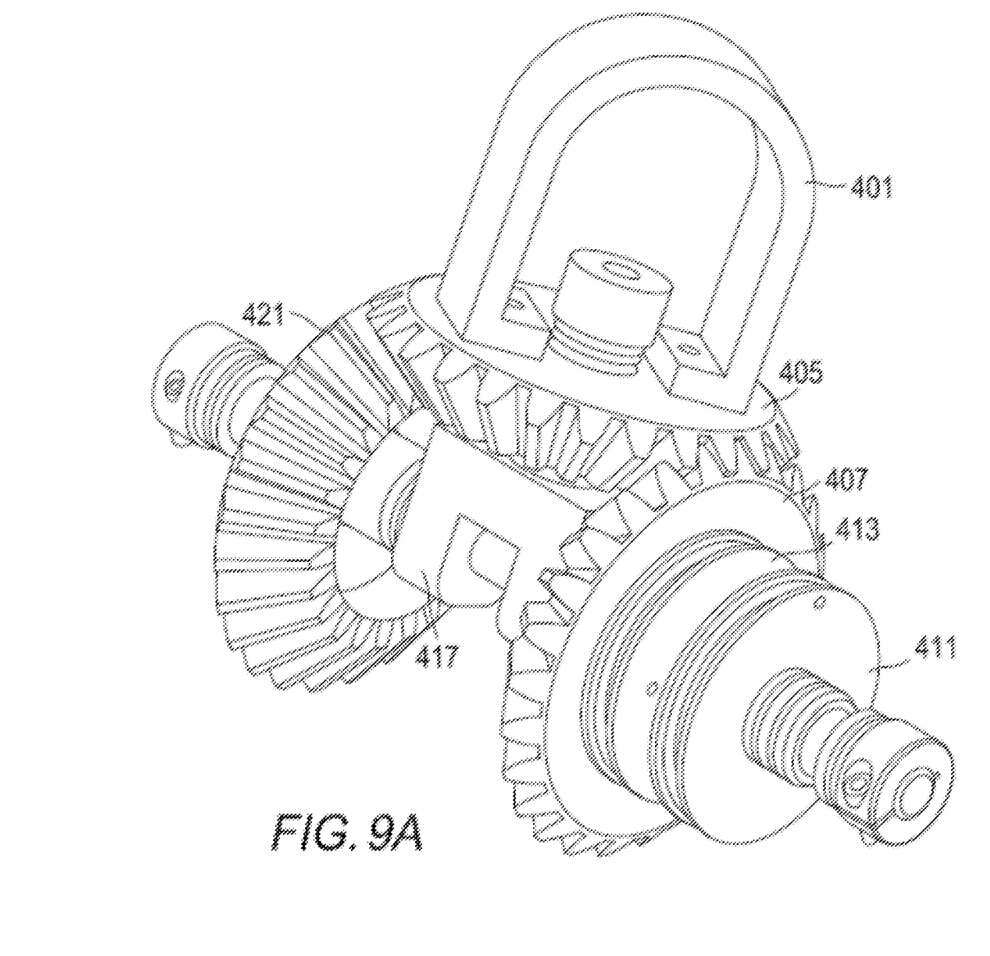
FIGS. 9A-9B show perspective view and a second view of the N+1 Mechanical Differential, according to one exemplary embodiment of the invention.
Figure 9B:
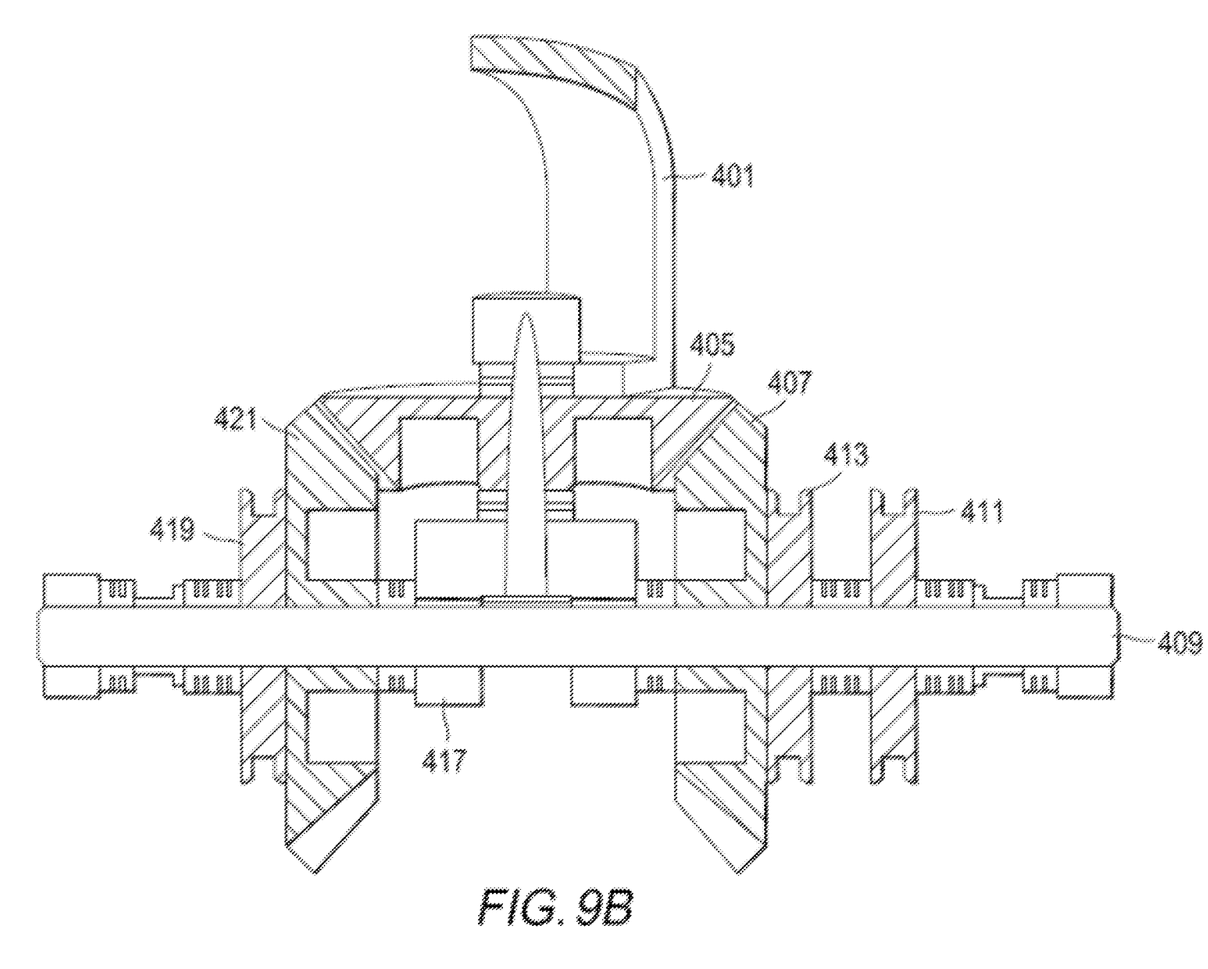

FIGS. 9A-9B show detailed views of the Mechanical Differentials in FIG. 8. FIG. 9A is a perspective view of a Mechanical Differential and FIG. 9B is a section view of a Mechanical Differential.

A system which includes the features in the foregoing description provides numerous advantages. In particular, the cable differential described herein can achieve modulation of mechanical characteristics such as joint friction, viscosity and stiffness. The cable differential described herein drastically increases the dynamic force range possible in force exertion.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed:

1. A cable-actuated differential having N degrees of freedom, comprising:
   (a) a first shaft with an associated first shaft direction, wherein the first shaft is supported by a mounting bracket, wherein a first pulley is fixedly attached to the first shaft, wherein a first tension element is attached to the first pulley, and wherein a first actuator is attached to the first tension element;
   (b) a first bevel gear to which is attached a second pulley, wherein a second tension element is attached to the second pulley, and wherein a second actuator is attached to the second tension element;
   (c) a second bevel gear to which is attached a third pulley, wherein a third tension element is attached to the third pulley, and wherein a third actuator is attached to the third tension element; and
   (d) a third bevel gear,
       wherein the first bevel gear is rotatably attached to the first shaft,
       wherein the third bevel gear meshes with the first bevel gear, an
       wherein the second bevel gear is rotatably attached to the first shaft such that the second bevel gear meshes with the third bevel gear.

2. The cable-actuated differential as set forth in claim 1, wherein in a first combination of tensions of the first actuator, the second actuator and the third actuator independently compel rotation about the first shaft direction.

3. The cable-actuated differential as set forth in claim 1, wherein in a second combination of tensions of the first actuator, the second actuator and the third actuator independently compel rotation.

4. The cable-actuated differential as set forth in claim 1, wherein in a third combination of tensions of the first actuator, the second actuator and the third actuator independently vary a structural loading in the cable-actuated differential.

5. The cable-actuated differential as set forth in claim 1, wherein each of the first actuator, the second actuator and the third actuator can independently vary their respective tensions.

6. The cable-actuated differential as set forth in claim 1, wherein tensions of each of the first actuator, the second actuator and the third actuator can be actively varied so as to eliminate slack of their respective tension element.

7. The cable-actuated differential as set forth in claim 1, wherein one or more of the first, second or third tension elements changes stiffness under loading.

\* \* \* \* \*